US010585596B2

(12) United States Patent
Balinski et al.

(10) Patent No.: US 10,585,596 B2
(45) Date of Patent: Mar. 10, 2020

(54) DYNAMIC I/O THROTTLING IN A STORLET ENVIRONMENT (71) Applicant: INTERNATIONAL BUSINESS MACHINES CORPORATION, Armonk, NY (US)

(72) Inventors: Peter A. Balinski, Elmhurst, NY (US); Sasikanth Eda, Vijayawada (IN); Ashwin M. Joshi, Pune (IN); John T. Olson, Tucson, AZ (US); Sandeep R. Patil, Pune (IN)

(73) Assignee: International Business Machines Corporation, Armonk, NY (US)

( * ) Notice: Subject to any disclaimer, the term of this patent is extended or adjusted under 35 U.S.C. 154(b) by 3 days.

(21) Appl. No.: 15/894,259

(22) Filed: Feb. 12, 2018

(65) Prior Publication Data
US 2019/0250832 A1 Aug. 15, 2019

(51) Int. Cl.
G06F 3/00 (2006.01)
G06F 3/06 (2006.01)
(Continued)

(52) U.S. Cl.
CPC .......... *G06F 3/0613* (2013.01); *G06F 3/0659* (2013.01); *G06F 3/0673* (2013.01); *G06F 13/102* (2013.01); *G06F 13/20* (2013.01)

(58) Field of Classification Search
CPC .... G06F 3/0613; G06F 3/0659; G06F 3/0673; G06F 13/102; G06F 13/20
(Continued)

(56) References Cited

U.S. PATENT DOCUMENTS 7,565,279 B2 * 7/2009 Bordes ................ G06F 17/5009
703/17
8,452,929 B2 * 5/2013 Bennett ............... G06F 11/1441
711/156
(Continued)

OTHER PUBLICATIONS

Mell et al., "The NIST Definition of Cloud Computing," National Institute of Standards and Technology, Sep. 2011, p. 1-3, Special Publication 800-145.
(Continued)

Primary Examiner — Tim T Vo
Assistant Examiner — Kim T Huynh
(74) Attorney, Agent, or Firm — L. Jeffrey Kelly (57) ABSTRACT A method, computer system, and a computer program product for dynamic IO throttling in a storlet environment is provided. The present invention may include receiving, from a user, a computational algorithm. The present invention may also include deploying the received computational algorithm. The present invention may then include determining the user has not engaged throttling based on the deployed computational algorithm. The present invention may further include parsing the computational algorithm based on the engaged throttling. The present invention may include identifying a pipeline operation based on the parsed computational algorithm. The present invention may also include building a timing relation between the identified pipeline operation and an IO operation. The present invention may then include translating a timing lag to a storage IO operation based on the built timing relation.

20 Claims, 7 Drawing Sheets (51) Int. Cl.
*G06F 13/10* (2006.01)
*G06F 13/20* (2006.01)

(58) Field of Classification Search
USPC .................................................. 710/60, 100
See application file for complete search history.

(56) References Cited

U.S. PATENT DOCUMENTS

| | | | |
|---|---|---|---|
| 2013/0031536 A1* | 1/2013 | De | G06F 8/427 |
| | | | 717/146 |
| 2013/0159376 A1* | 6/2013 | Moore | H04L 67/10 |
| | | | 709/202 |
| 2013/0173803 A1* | 7/2013 | Pijewski | G06F 9/5072 |
| | | | 709/226 |
| 2013/0346615 A1* | 12/2013 | Gondi | G06F 9/5016 |
| | | | 709/226 |
| 2015/0205474 A1* | 7/2015 | Donelan | G06F 3/0485 |
| | | | 715/784 |
| 2015/0235044 A1 | 8/2015 | Cohen et al. | |
| 2016/0366068 A1 | 12/2016 | Eda et al. | |
| 2017/0286178 A1* | 10/2017 | Chougule | G06F 9/50 |
| 2017/0329792 A1* | 11/2017 | Banerjee | H04L 67/1097 |

OTHER PUBLICATIONS

Rabinovici-Cohen et al., "Storlet Engine: Performing Computations in Cloud Storage," IBM Research Report, Aug. 4, 2014, pg. 1-12, H-0320 (HAI1408-001).

* cited by examiner

DYNAMIC I/O THROTTLING IN A STORLET ENVIRONMENT

BACKGROUND

The present invention relates generally to the field of computing, and more particularly to embedded computing.

Scale out object storage units may be built by reusing existing storage infrastructure with commodity hardware. Storage in large enterprise computing environments may primarily be derived from various storage area network (SAN) devices maintained as a pool and supplied to compute units depending on necessity. A storlet engine may be deployed within an object storage unit and may be a virtualization unit that decides which node would be selected to execute a user deployed computation algorithm.

SUMMARY

Embodiments of the present invention disclose a method, computer system, and a computer program product for dynamic IO throttling in a storlet environment. The present invention may include receiving, from a user, a computational algorithm. The present invention may also include deploying the received computational algorithm. The present invention may then include determining the user has not engaged throttling based on the deployed computational algorithm. The present invention may further include parsing the computational algorithm based on the engaged throttling. The present invention may include identifying a pipeline operation based on the parsed computational algorithm. The present invention may also include building a timing relation between the identified pipeline operation and an IO operation. The present invention may then include translating a timing lag to a storage IO operation based on the built timing relation.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for embedded computing. As such, the present embodiment has the capacity to improve the technical field of storlet engine workflow by enabling dynamic Input-Output (IO) throttling within a cluster. More specifically, the storlet engine workflow with dynamic IO throttling will identify data parallelism, estimate pipelined operations in a computational algorithm, identify object storage locations and alter the throttling limits per object storage.

As previously described, scale out object storage units may be built by reusing existing storage infrastructure with commodity hardware. Storage in large enterprise computing environments may primarily be derived from various SAN devices maintained as a pool and supplied to compute units depending on necessity. A storlet engine may be deployed within an object storage unit and may be a virtualization unit that decides which node would be selected to execute a user deployed computation algorithm. Virtualization units may include, for example, a kernel-based virtual machine (KVM), ZeroVM® (ZeroVM and all ZeroVM-based trademarks and logos are trademarks or registered trademarks of Rackspace US Corporation and/or its affiliates) or containers (e.g., Docker® containers) (Docker and all Docker-based trademarks and logos are trademarks or registered trademarks of Docker, Inc. and/or its affiliates). Middleware or software units may also be used to select a node to invoke a virtualization unit to execute a user deployed computation algorithm.

Traditional object storage architecture may have two node groups (i.e., two entities). Each node group may have multiple nodes. One node group may, for example, be a proxy node and may be used for a distributed load handling (i.e., a request handling) in a namespace. Distributed load handling may distribute the workload (e.g., IO operations) using multiple computing devices based on the computing resources available to perform the workload. A namespace may include a container that stores a group of unique identifiers, such as a name, a type, a variable or a function. The other node group may be a storage node that may be responsible for writing to a disk (i.e., a storage subsystem). The storage node may serve as a storage unit or a repository for analysis of data residing in the storage unit.

For example, a client or a compute node can extract meaningful information from raw data. Raw data may include, for example, data collected from a source, a sensor, an internet of things (IoT) device, a video, a microphone, a biometric reading, a figure, an instrument reading or numbers. The traditional object storage architecture may have a client sending and receiving IO data (i.e., IO content, user content or user uploaded content). The IO data may be sent through a load balancer before the IO reaches a proxy node or a storage node. The data may be pulled from the object storage to other compute client nodes for further processing or analysis. For example, if a client would like to search for an image (e.g., jpeg) that contains certain words or a certain person, in order to execute the search, traditional storage architecture may need to pull all images to client computing device and then run the search analytics (i.e., parameters).

An embedded compute engine based object storage architecture may have a virtualization unit (i.e., a virtual machine or a container) on each node (i.e., storage nodes and proxy nodes). A virtualization unit at each node may offer flexibility for a user (i.e., user may offload a computation algorithm). For example, a user is searching for an image (i.e., jpeg or PNG) containing the word IBM, representing IBM® (IBM and all IBM-based trademarks and logos are trademarks or registered trademarks of International Business Machines Corporation and/or its affiliates). The user may upload or PUT the algorithm to the object storage. The proxy server middleware may identify the previously uploaded object as a compute algorithm, parse the algorithm and offload the computation to any of the virtualization unit(s). The virtualization unit may then return the results to user as an object or store results as an object.

A storlet engine may execute computation modules to produce value from stored data. A storlet engine may expand a cloud storage model by, for example, keeping the executed computational module in close proximity to where the data is stored. A cloud storage model may enable users to access data from a user device and from a user location. Both the user device and the user location may change in location, however, the user will still have access to the cloud stored data. A storlet engine may run or execute computational modules dynamically by storing the module near the stored data and running the executable code from a sandbox. A sandbox may be used to partition or isolate the storlet engine (i.e., executable computation module) from other storlet engines and from other stored data.

Storlet architecture may include an embedded compute infrastructure with a built-in object storage. Object storage may include structured and unstructured data. Structured data may include data that is highly organized, such as a spreadsheet, relational database or data that is stored in a fixed field. Unstructured data may include data that is not organized and has an unconventional internal structure, such as a portable document format (PDF), an image, a presentation, a webpage, video content, audio content, an email, a word processing document or multimedia content. The storlet architecture may include a software engine (i.e., storlet engine or embedded computation engine) stored in one node or in multiple nodes. The node may, for example, be a storage node or a proxy node. The end user may frame and deploy the computation algorithm to the storlet engine as a normal object PUT operation. For example, a user deploys a compute algorithm searching for objects containing the word IBM and zipping them. The compute algorithm may be written to a file and may be uploaded using a distinguishing header, such as x-compute-algorithm, and may be used to differentiate the computation algorithm against a normal object.

Storlet architecture may allow data analysis without additional client or compute node resources used for the data analysis. A storage node or a proxy node may act as a compute node and return a response to the user with results by using a software engine stored in the storage node or the proxy node. Storlet architecture may use virtualization units such as virtual machines (VM) or KVM, Linux containers or Dockers® or ZeroVM® deployed on a node to perform the computation task. A virtualization unit on each node may act as the computation engine or processing engine. The computation algorithm path may flow, for example, from a user, through a load balancer to a proxy node with a storlet middleware, then to a storage or proxy node with a virtualization unit. The embedded compute engine may be based on object storage architecture. The embedded computation engine within the storage node or proxy node may provide analysis and computation as a standalone computation without a need to use an external compute device (e.g., a client's computer or smartphone) to process the data.

A storlet environment that does not limit IO throughput (i.e., no throttling on a virtualization unit) may impact performance of object IO requests. For example, if a user is seeking a stack object (i.e., image or jpeg) containing the word IBM, with a compute algorithm

```
{
    x-headers: AUTH-123XXX,
    content: {
        "select *.jpg with content of IBM and encrypt them"
    }
}
``` the virtualization units will begin fetching all of the jpegs from the storage nodes. If there are 4 virtualization units and 4 SAN-Volumes, each virtualization unit may have access to each storage volume (i.e., storage locations). Once a user uploads a compute algorithm to identify an object with the word IBM, the storlet engine may off-load the computation to one of the 4 virtualization units. In order to execute the compute algorithm, the virtualization unit will begin fetching data from the storage nodes. For example, Image 1 is on Volume 1, Image 2 is on Volume 2, Image 3 is on Volume 3 and Image 4 is on Volume 4. Object storage IO performance may be lost since the whole storage bandwidth can be consumed by the virtualization unit when a virtualization unit on a proxy or storage node does not have any IO restrictions (i.e., no throttling).

IO throughput may be measured by units of information (i.e., data) that may be processed over a period of time. IO may be measured by how many input or output operations per second (IOPS) are processed, for example, 500 bytes per second, 500 IOPS, 500 read IOPS or 500 write IOPS. An example of demonstrating the assignment of different IOs per storage object may use IO throttling. IO throttling may include selectively slowing down the IO requests (i.e., IO operations) of an application or a host and processing the requests one at a time in the order the requests were received. The IO throttling may generally be used to set a maximum rate a host may be permitted to initiate IOs to a particular storage device. A storage object may, for example, be based on volume, a virtual disk (vdisk), a managed disk (mdisk) or a physical disk (pdisk). A vdisk may include, for example, a virtual device with storage capacity access to a physical disk drive on a computer. A mdisk may include a logical unit of physical storage. A pdisk may include, for example, a disk array that is formatted to 528 bytes per sector. When throttling is used, for example per value or per storage unit, an end user may be queued to slow down to meet the IOPS setting.

Object storage architecture and storlet architecture may use an algorithm to optimize a storlet engine workflow by enabling dynamic IO throttling within a cluster. A storlet engine execution may be used once a user deploys a computational algorithm (e.g., a GET or a PUT operation). The storlet engine may then parse the operation for syntax errors and determine the computation operation. The computation operation may be arithmetic related, compression related, encryption related or a specialized operation, such as converting a text to a pdf or editing a jpeg. The storlet engine may then determine a node to be used for instantiating the virtualization unit based on the availability of resources. Resource availability may include a node that has the highest utilizable resources at the time the storlet deployment has opted for execution. The computation operation may then be sent to the virtualization unit. The virtualization unit may fetch, read or write data based on the steps defined in the computation algorithm. The storlet engine may then return a Hypertext Transfer Protocol (HTTP) or Representational State Transfer (REST) code with a success or failure to the user with the results.

A storlet engine execution may use one sandbox or more than one sandbox. A sandbox may be limited by quality of service (QoS) based resource templates, for example, in terms of a central processing unit (CPU) and memory (e.g., RAM). For example, a QoS based resource template may include a sandbox for a gold user limited to use CPU=2 and RAM=10 GB and a sandbox for a Bronze user limited to use CPU=1 and RAM=1 GB.

Sandboxes used for executing storlets may have unlimited access to storage resources (i.e., no IO throttling). IO throttling in a storlet environment may be achieved at various levels. One level to achieve IO throttling in a storlet environment may be based on applying an IO throttling per process. As each container is a separate process in the operating system, IO throttling may be applied at the process identifier (PID) of the specific container process. One other level to achieve IO throttling in a storlet environment may be based on applying an IO throttling per host. As each container is invoked on either a proxy node or a storage node, IO throttling may be applied per host which may be serving the container execution. The proxy node or the storage node may act as a host for the storage object. Another level to achieve IO throttling in a storlet environment may be based on applying IO throttling based on an algorithm category. IO throttling may be applied based on the fed computation algorithm category. A host or a container process that is responsible for executing a throttling tagged computation algorithm may be used to apply IO throttling.

Applying the IO throttling per process, per host or based on an algorithm category may be static in nature and less efficient than a dynamic IO throttling process. Therefore, it may be advantageous to, among other things, create an algorithm or a framework that dynamically changes the IO throttling limits per storage object by estimating the pipelined operations involved in the fed computation algorithm. One other factor that may assist with dynamically changing IO throttling may include, in addition to the estimated pipelined operations involved in the fed computation algorithm, estimating storage object locations needed for fetching or executing the pipelined operations, such as volumes or disks that may be accessed for fetching or executing computation operations.

According to at least one embodiment, a dynamic throttling program may optimize a storlet engine workflow by enabling dynamic IO throttling within a cluster. A cluster of nodes may have a workload distributed across multiple nodes. The dynamic throttling program may parse fed storlet computations, estimate the pipelined operations and identify the object location that may need to be fetched for serving compute operation, which allow a dynamic IO throttling template to be prepared and deployed at a storage controller or per storage object (i.e., by volume or by virtual disk layer).

Dynamic IO throttling may provide flexibility to a traditional storlet architecture by identifying data parallelism and the pipelined compute operations that are involved in the deployed storlet computation. Data parallelism may provide for the distribution of data, for example, across multiple nodes or multiple processors. Dynamic IO throttling may also estimate pipelined operations involved in computational algorithms (e.g., PUT or fed commands).

Flexibility may also be provided by identifying the objects and the objects' respective storage locations that may need to be fetched, read, executed or modified by the deployed compute operations and accordingly change the IO throttling limits (e.g., per storage object). The storage locations may include locations across all of the storage nodes in the cluster. Flexibility may also be offered by building a timing relationship between the pipelined compute operations and the object IO operations by translating the timing lag to storage IOPS and deploying the storage IOPS at the storage controller or per storage object (e.g., per volume or per virtual disk).

In a QoS environment, a dynamic throttling program may provide throttling based on the number of IO operations by identifying pipelined operations in a storlet environment using an algorithm that parses fed storlet computations and estimates the pipelined operations involved. Additionally, object locations that may need to be fetched for serving pipelined compute operations may be identified. Based on object location, a delay in executing compute operation dynamic IO throttling template may be generated and deployed at a storage controller or a per storage unit.

For example, a compute algorithm of A+B+C is uploaded by a user. A is a value stored in a file that is stored in Volume 1. B is a value stored in a file that is stored in Volume 2. C is a value stored in a file that is stored in Volume 3. Each volume represents a different storage node. The compute algorithm uploaded by the user is sent to the cluster of volumes (i.e., Volume 1, Volume 2 and Volume 3) and in order to solve the compute algorithm, the virtualization unit needs to read the 3 different files. If the virtual central processing unit (vCPU) is limited to reading two values at one time, at $t_0$ (i.e., the first compute operation) the dynamic throttling program will parse the algorithm and allow reading (A+B) from Volume 1 and Volume 2, respectively, with no throttling, while applying throttling restrictions on Volume 3. The computation will provide a result of X, at $t_0$ (A+B=X). The next compute cycle, at $t_1$, will combine the result or the output of X with C (X+C). At $t_1$ the dynamic throttling program will apply throttling restrictions to Volume 1 and Volume 2 and exclude throttling restrictions on Volume 3 to read the value of C.

Figure 1:
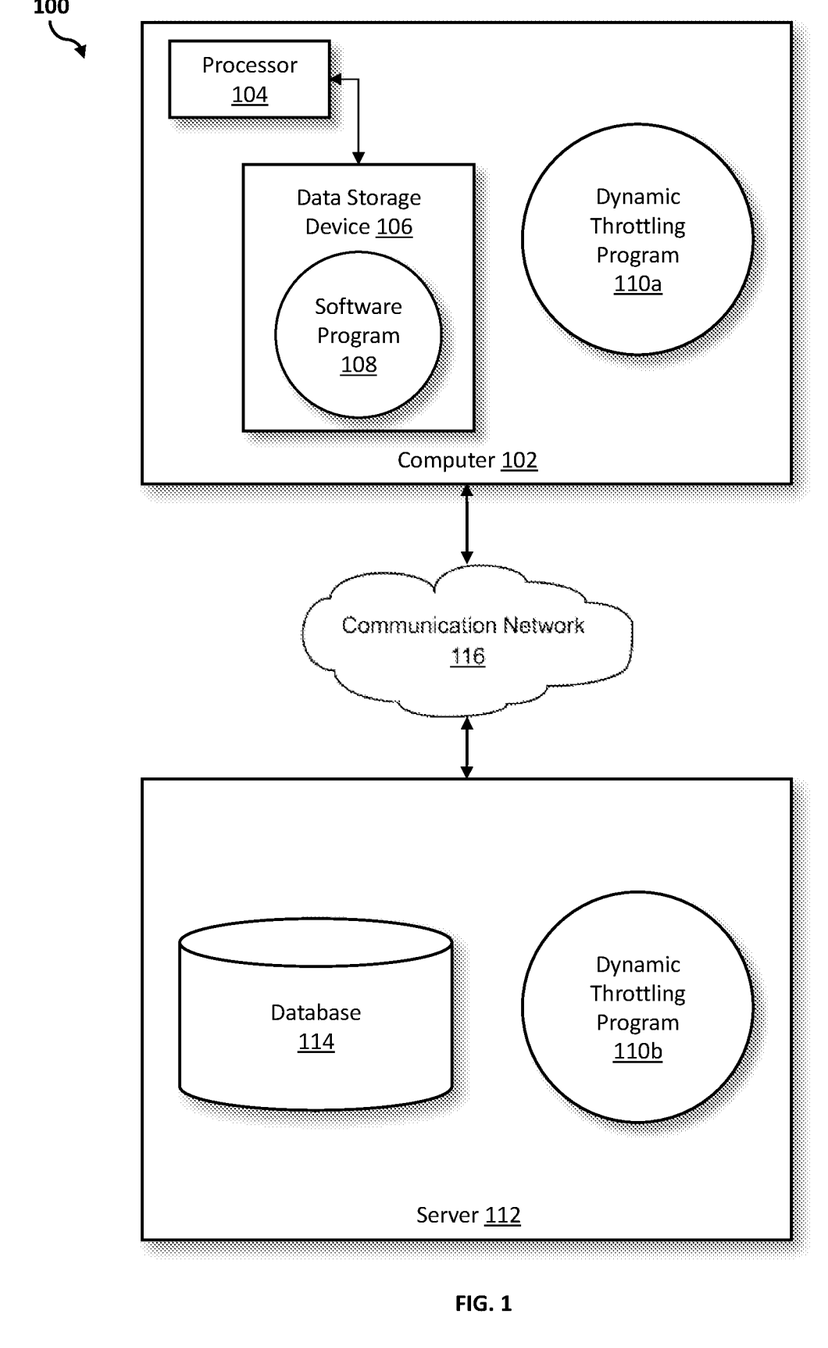
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a dynamic throttling program 110a. The networked computer environment 100 may also include a server 112 that is enabled to run a dynamic throttling program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 5, server computer 112 may include internal components 902a and external components 904a, respectively, and client computer 102 may include internal components 902b and external components 904b, respectively. Server computer 112 may also operate in a cloud computing service model, such as Software as a Service (SaaS), Analytics as a Service (AaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the dynamic throttling program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the dynamic throttling program 110a, 110b (respectively) to achieve dynamic IO throttling in a storlet environment. The dynamic IO throttling in a storlet environment method is explained in more detail below with respect to FIGS. 2-4.

Figure 2:
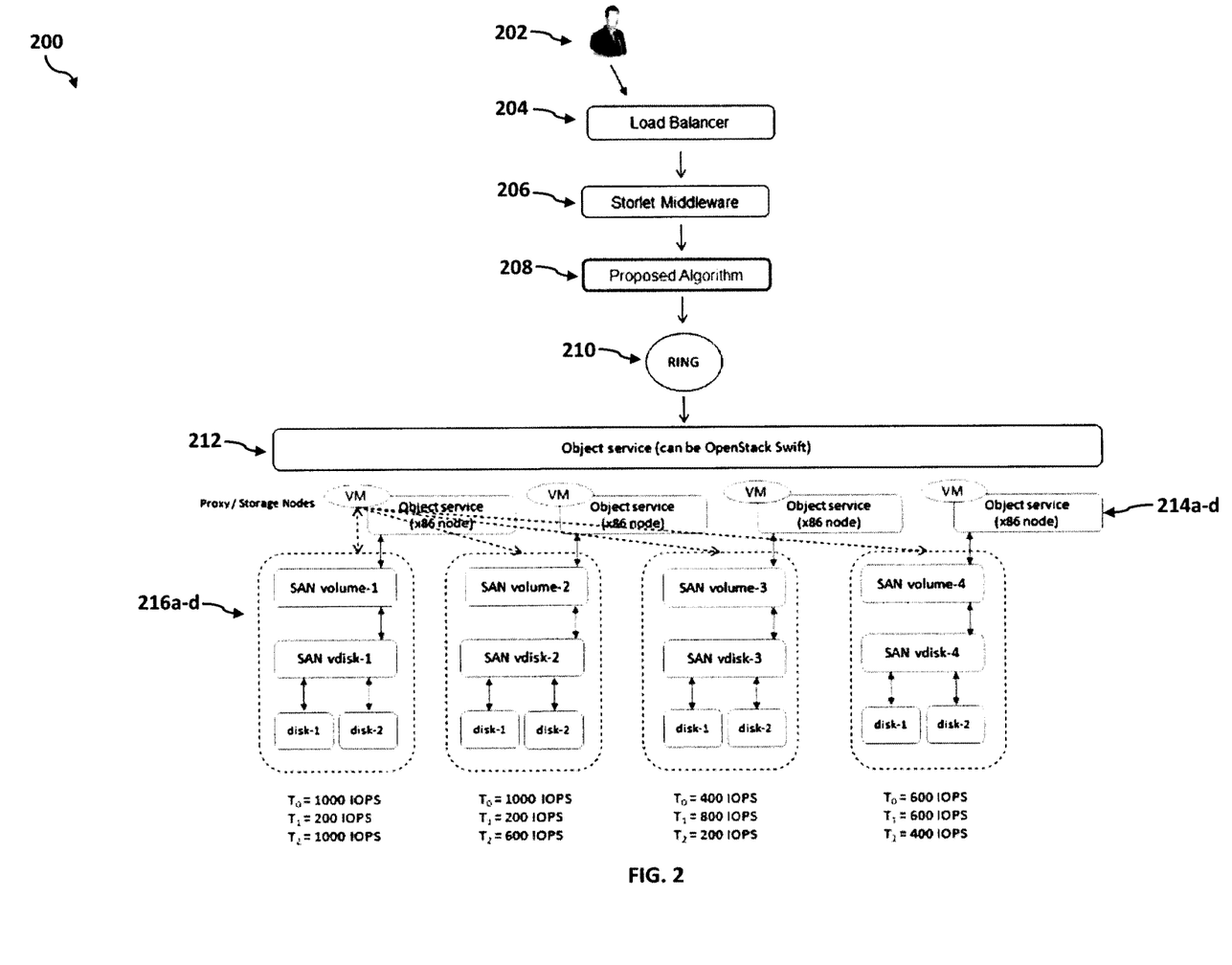
FIG. 2 is a block diagram example of an optimized storlet engine workflow according to at least one embodiment.

Referring now to FIG. 2, a block diagram example illustrating the exemplary optimized storlet engine workflow process 200 used by the dynamic throttling program 110a, 110b according to at least one embodiment is depicted.

At 202, a user may upload a computation algorithm or an object path to a load balancer 204. A computational algorithm may include, for example, an algorithm, input parameters, mode of execution (e.g., synchronous or asynchronous) and output mode (i.e., whether to send results back to a user or store the results as a separate object). An object upload path may, for example, use middleware for user authentication during the object upload. A load balancer 204 may determine which node or which nodes to allocate requests. The user uploaded content may then be transmitted to storlet middleware 206. Storlet middleware 206 may assist in deciding if the uploaded content is a computational algorithm or if the uploaded content is an object, for example, based on a separate header used during the PUT or based on the metadata appended to the object.

The proposed algorithm 208 may identify the data parallelism operations and the pipelined operations. The proposed algorithm 208 may also identify the objects and the objects' storage locations that may need to be fetched. A timing relationship may be built and then the timing lag may be translated to storage IOPS. The proposed algorithm 208 may act on a fed compute algorithm, estimate the data input needed for execution and use the object placement data structure (e.g., a Ring 210) to further determine the data input locations. In addition to data input, the proposed algorithm 208 may estimate the phases of the algorithm where inputs are needed by estimating the amount of time needed to reach each phase. Each phase may need data input, for example, estimating using a statistical base or estimating using simple instructions solved per second calculations. Further estimates of the timing lag of data fetch from volumes may be based on the amount of time per phase.

The ring 210 may include a software based storage platform that stores objects and files and may work with various servers. The ring 210 may map a user to a physical location. A ring may include, for example, the OpenStack® Ring (OpenStack Ring and all OpenStack Ring-based trademarks and logos are trademarks or registered trademarks of OpenStack and/or its affiliates). The object service 212 may be responsible for understanding the backend (e.g., filesystem), may elect the storage nodes and may be responsible for replicating data across the storage nodes. An object service 212 may include, for example, OpenStack® Swift (OpenStack Swift and all OpenStack Swift-based trademarks and logos are trademarks or registered trademarks of OpenStack and/or its affiliates). OpenStack® Ring may map data to a physical location and OpenStack® Swift may provide different levels of service to a client by configuring storage policies.

The storage node 214a-d may be powered by storage derived from a storage area network (SAN). The storage node 214a-d may include an object service hosting virtual machine. The object service node may include a SAN Volume controller, a SAN virtual disk (vdisk) and physical disks (disks) 216a-d. Each storage node 214a-d may be set to process varying IOPS.

Figure 3:
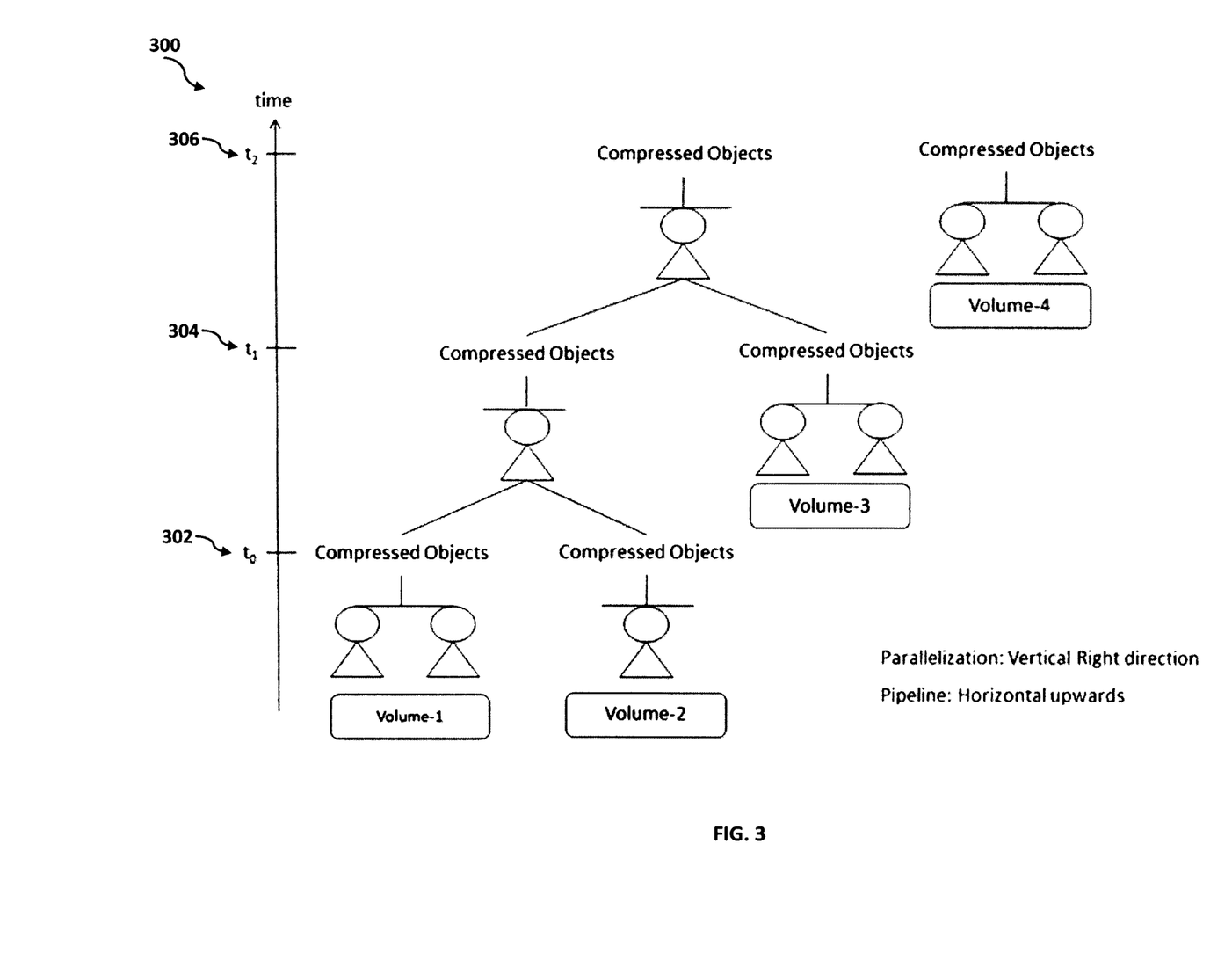
FIG. 3 is an example of pipelined compute operations and data parallelism according to at least one embodiment.

Referring now to FIG. 3, an example illustrating the exemplary pipelined compute operations and data parallelism process 300 used by the dynamic throttling program 110a, 110b according to at least one embodiment is depicted. The pipelined compute operations and data parallelism process 300 used by the dynamic throttling program 110a, 110b may identify the data parallelism operations and compute operations involved in a deployed storlet computation algorithm.

For example, a user deploys a storlet computation algorithm that performs a lossless compression of already compressed objects. Each virtual CPU (vCPU) core may be used to read and compress a subset of objects at an initial pass. One vCPU core may perform compression of the already compressed objects prepared in the first pass. The dynamic throttling program 110a, 110b may identify the pipelined compute operations and the data parallelism operations and an existing parallelism involved in the fed (i.e., user inputted) computation algorithm.

The dynamic throttling program 110a, 110b may identify the objects and the objects respective storage locations across one node or across multiple nodes in a storage cluster that may be fetched, read or modified by the deployed compute operations (e.g., user uploaded content).

An object stored in a respective storage location on each object storage node in a cluster may be identified based on pipeline stages. A pipeline stage may include the object (i.e., data) provided at a specific time. For example, $t_0$ 302 may be considered stage 1 and pipeline stage 1 may need objects from Volume-1 and Volume-2. $t_1$ 304 may be considered stage 2 and pipeline stage 2 may need objects from Volume-3. $t_2$ 306 may be considered stage 3 and pipeline stage 3 may need objects from Volume-4.

The dynamic throttling program may build a timing relationship between the pipelined compute operations and the object IO operations. Translating the timing lag to storage IOPS and deploying the storage IOPS, for example, at the storage controller or per storage object (i.e., per volume or per vdisk layer). The timing lag may then be translated to storage IOPS and deploy the storage IOPS based on the identified pipeline stages (i.e., $t_{0-3}$) and the object IO operations.

A dynamic throttling template may be prepared and applied, for example, at a SAN storage controller powering the object storage cluster or applied per storage object as follows:

$t_0$={Volume-1: 1000; Volume-2: 1000; Volume-3: 400; Volume-4: 600}, $t_1$={Volume-1: 200; Volume-2: 200; Volume-3: 800; Volume-4: 600}, and $t_2$={Volume-1: 1000; Volume-2: 600; Volume-3: 200; Volume-4: 400}, where 1000 is the maximum IOPS and 200 is the minimum IOPS.

Figure 4:
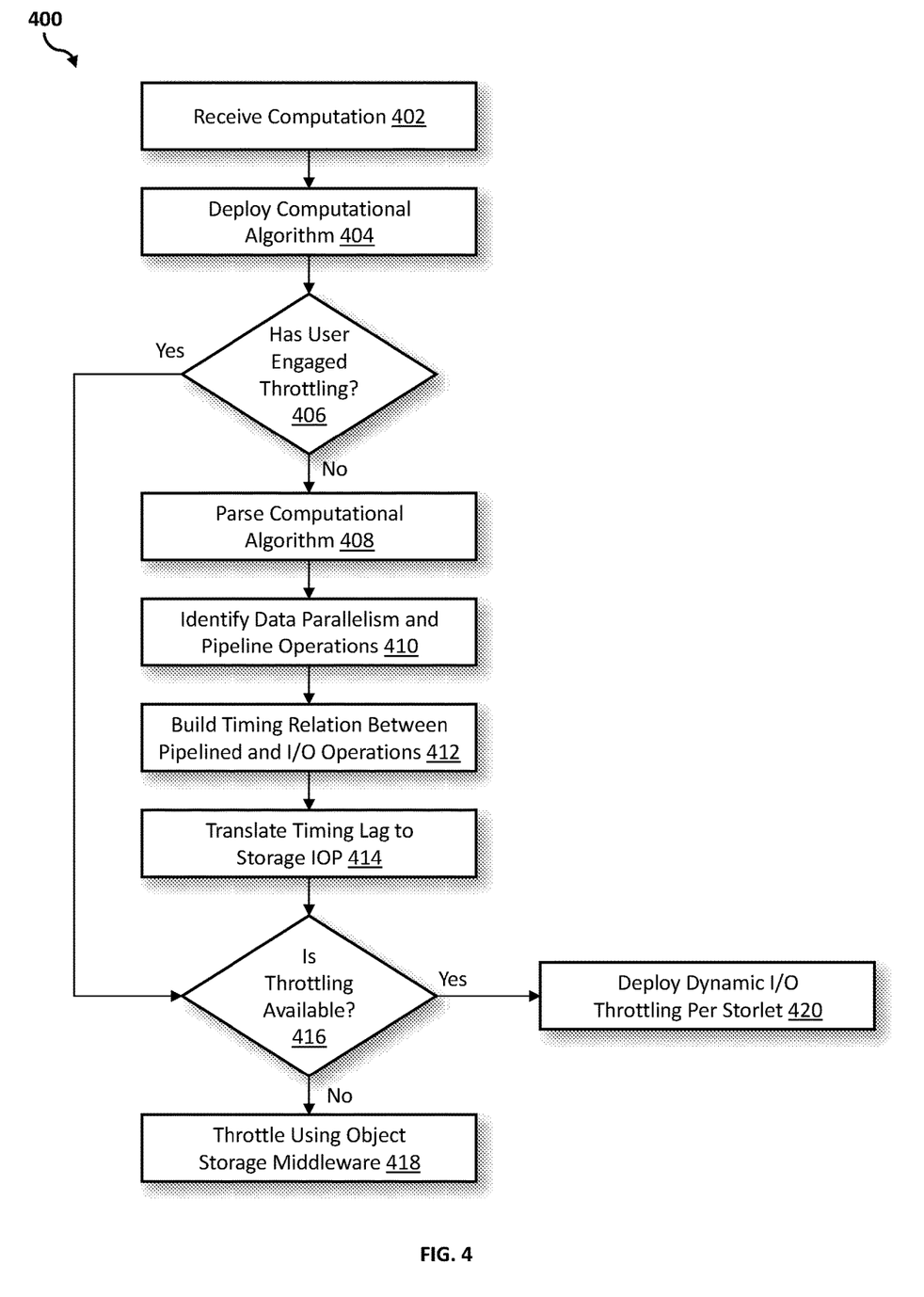
FIG. 4 is an operational flowchart illustrating a process for dynamic IO throttling in a storlet environment according to at least one embodiment.

Referring now to FIG. 4, an operational flowchart illustrating the exemplary dynamic IO throttling in a storlet environment process 400 used by the dynamic throttling program 110a, 110b according to at least one embodiment is depicted.

At 402, a computation is received. The received computation may include, for example, a user GET or a PUT operation. The user may upload an object or may search for an object in storage. A computation algorithm may be created based on the user's object upload. From a previous example, the user is searching for an image (i.e., jpeg or PNG) containing the word IBM, which produces the following computational algorithm

```
{
    x-headers: AUTH-123XXX,
    content: {
        "select *.jpg with content of IBM and encrypt them"
    }
}.
```

Then, at 404, a computational algorithm is deployed. A computational algorithm may represent the computation algorithm from a user that may be received by the proxy node and passed to storlet middleware. Storlet middleware may parse jobs and schedule jobs.

Next, at 406, the dynamic throttling program 110a, 110b determines if the user has engaged throttling. The dynamic throttling program 110a, 110b may locate user throttling in the algorithm as, for example, a flag, a trigger or a location in the computational algorithm created by the user.

If the user has not engaged throttling at 406, then a computational algorithm is parsed at 408. Parsing a job may provide proper and efficient steps for the computation algorithm to proceed with the job. Scheduling a job may find the proper node to send the computation algorithm to. A proper node may contain a virtualization unit with resources sufficient to execute the computation. Once the computation is complete, the results are consolidated and transmitted back to the storlet middleware by the virtualization unit.

At 410, data parallelism operations and pipeline operations are identified. The user's uploaded content may be analyzed, for example, by the storlet middleware. The storlet middleware may assist in identifying if the user uploaded content is an object or a computational algorithm. For example, if the uploaded content is an object, identification may be based on a separate header used during the user PUT operation or based on the metadata appended to the object.

Pipelined compute operations may compress a group of objects that satisfy a given criteria (e.g., images containing a specific word). Pipelined operations may involve identifying objects corresponding to a given criteria, such as reading data blocks corresponding to objects, identifying patterns for compression, compression using compression algorithms (e.g., Huffman coding).

Data parallel operations may include distributing data across different nodes and operating on data in parallel. For example, the deployed computation algorithm may invoke virtualization units on multiple proxy or storage nodes to fetch objects within the provided criteria. The objects may be read in parallel from multiple nodes, and may be compressed per node (i.e., objects read from a particular node are compressed by the same node). A compressed result from each node that may be sent to a master virtualization unit. The virtualization unit may generate, for example, a single compressed object combining the compressed objects from all nodes in a cluster.

Then, at 412, a timing relation between the pipelined operations and the IO operations are built. A timing relationship may be built by translating the timing lag to storage IOPS. Then, deploying the storage IOPS at the storage controller or per storage object (e.g., per volume or per virtual disk). The dynamic throttling program 110a, 110b may determine the phases of the algorithm needed by estimating the time needed to reach each phase. For example, a statistical base may be used to identify the timing of each phase. An alternate phase estimate may include the timing lag of data fetched from volumes.

Next, at 414, timing lag to storage IOP is translated. Timing lag is translated to storage IOPS by deploying the storage IOPS at the storage controller or per storage object, such as per volume or per virtual disk layer. A timing lag translation example, as discussed previously, is provided in FIG. 3.

If the user has engaged throttling at 406 or if the timing lag to storage IOP has been translated at 414, the dynamic throttling program 110a, 110b determines if throttling is available at 416. The dynamic throttling program 110a, 110b may calculate if throttling should be provided for the deployed computation algorithm and decides which layer may apply throttling most efficiently. Throttling on storlet architecture may be applied at two layers. One layer is at the middleware layer and the other layer is dynamically applying the IO throttling per storlet (i.e., applying the IO throttling per computation algorithm). In an alternate embodiment, throttling may also be configured by an administrator or a decision based on a statistical analysis or past execution models.

If throttling is not available at 416, then throttling object storage middleware is used at 418. Throttling object storage middleware may be applied at the middleware layer and the throttling is applied per computation algorithm. For example, a user deploys 2 algorithms in the same instance, the middleware throttling may identify applying throttling with 'X' IOPS to the first algorithm and 'Y' IOPS to the second algorithm. The IOPS limits may be applied per algorithm and operations involved in this algorithm may not exceed the IOPS limits. The storlet middleware may then send the results to the user as, for example, a Hypertext Transfer Protocol (HTTP) or a Representational State Transfer (REST) response.

If throttling is available at 416, then a dynamic IO throttling per storlet is deployed at 420. Dynamic IO throttling per storlet may execute a computational algorithm based on the built timing relations. The computational algorithm may be transferred to a deployed storlet and the IOPS per compute step are varied based on the built timing relations.

It may be appreciated that FIGS. 2-4 provide only an illustration of one embodiment and do not imply any limitations with regard to how different embodiments may be implemented. Many modifications to the depicted embodiment(s) may be made based on design and implementation requirements.

Figure 5:
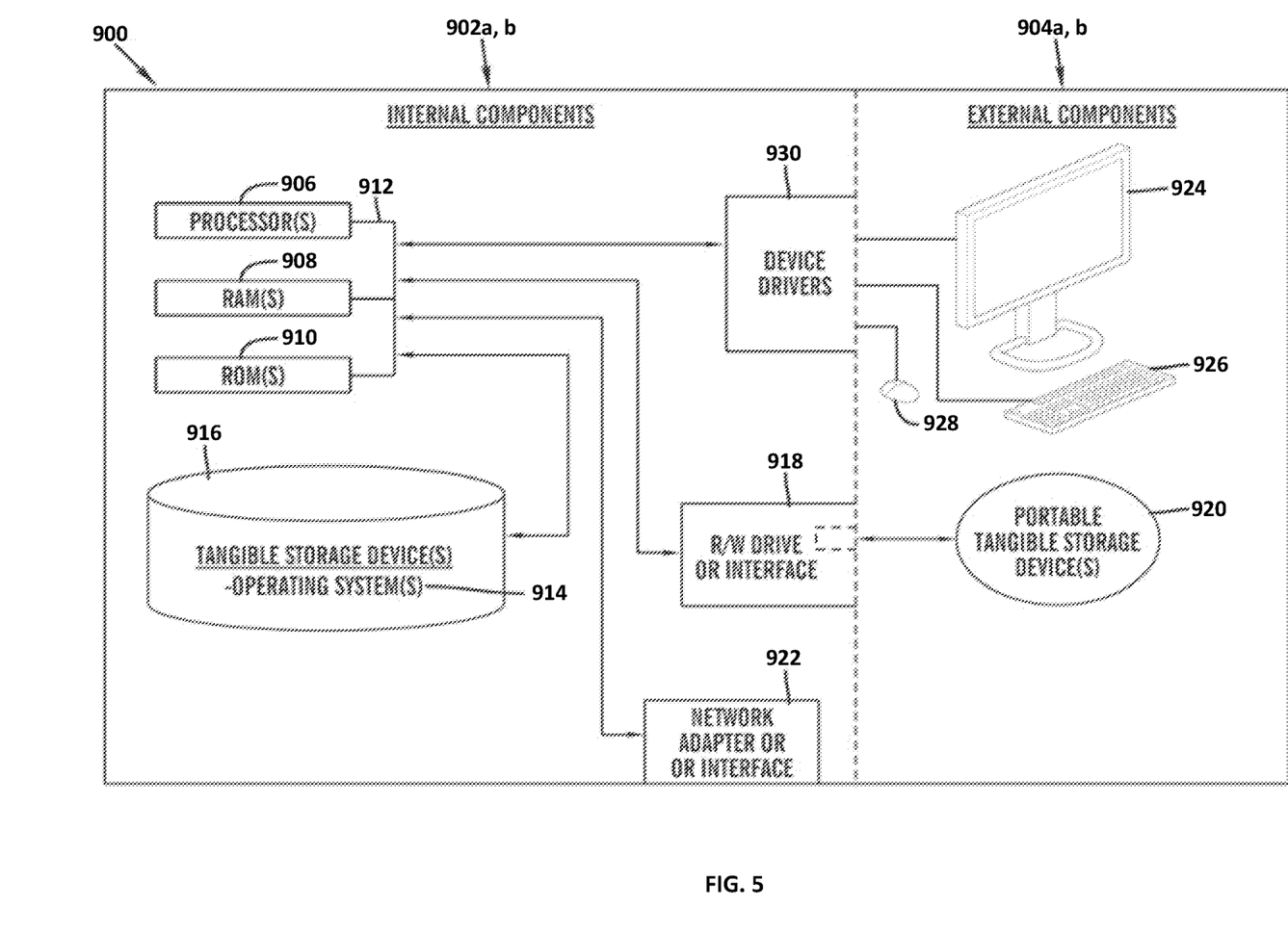
FIG. 5 is a block diagram of internal and external components of computers and servers depicted in FIG. 1 according to at least one embodiment.

FIG. 5 is a block diagram 900 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 5. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108 and the dynamic throttling program 110a in client computer 102, and the dynamic throttling program 110b in network server 112, may be stored on one or more computer-readable tangible storage devices 916 for execution by one or more processors 906 via one or more RAMs 908 (which typically include cache memory). In the embodiment illustrated in FIG. 5, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the dynamic throttling program 110a, 110b can be stored on one or more of the respective portable computer-readable tangible storage devices 920, read via the respective R/W drive or interface 918, and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the dynamic throttling program 110a in client computer 102 and the dynamic throttling program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the dynamic throttling program 110a in client computer 102 and the dynamic throttling program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
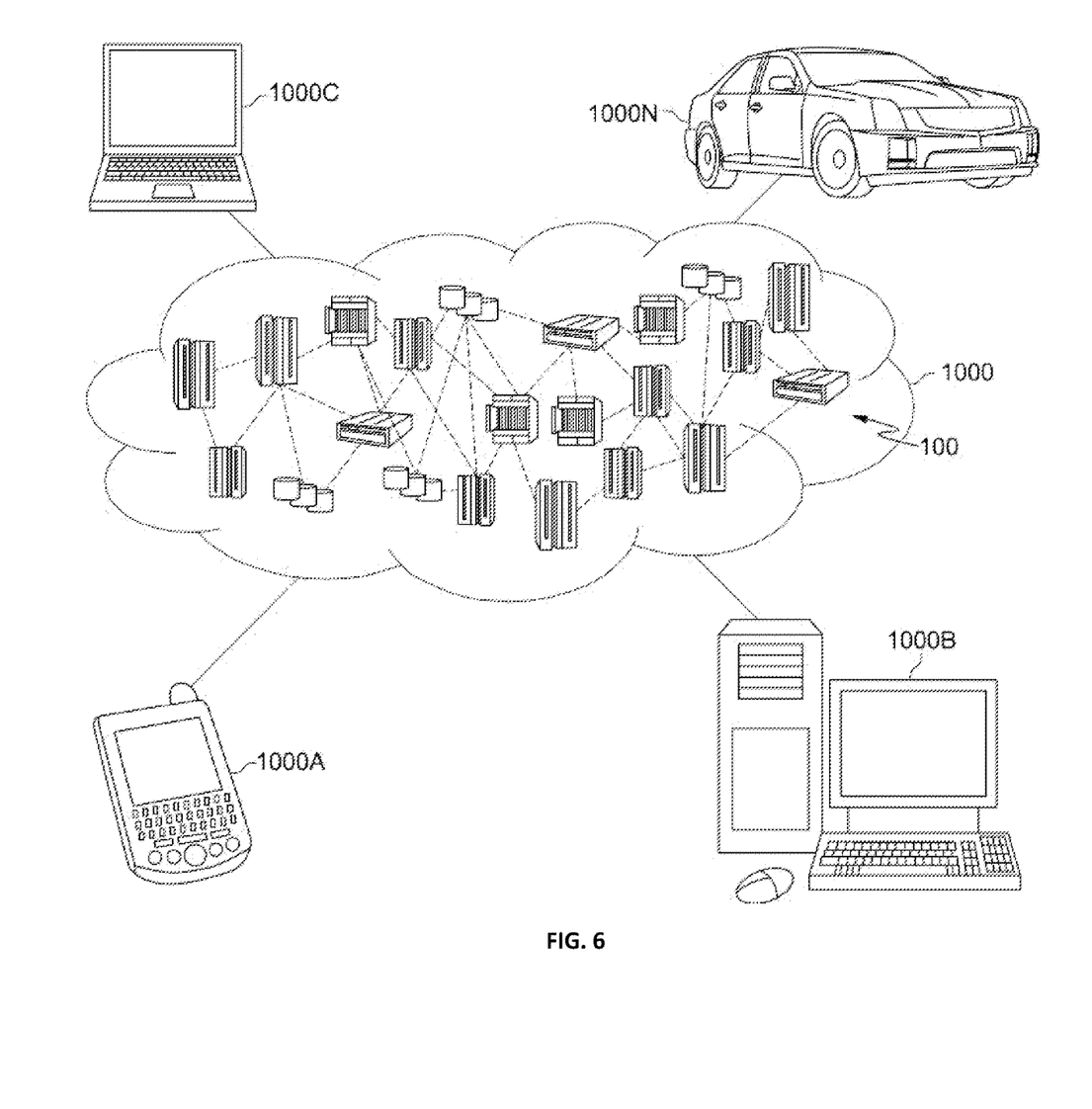
FIG. 6 is a block diagram of an illustrative cloud computing environment including the computer system depicted in FIG. 1, in accordance with an embodiment of the present disclosure.

Referring now to FIG. 6, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 100 and cloud computing environment 1000 can communicate with any type of computerized device over any type of network and/or network addressable connection (e.g., using a web browser).

Figure 7:
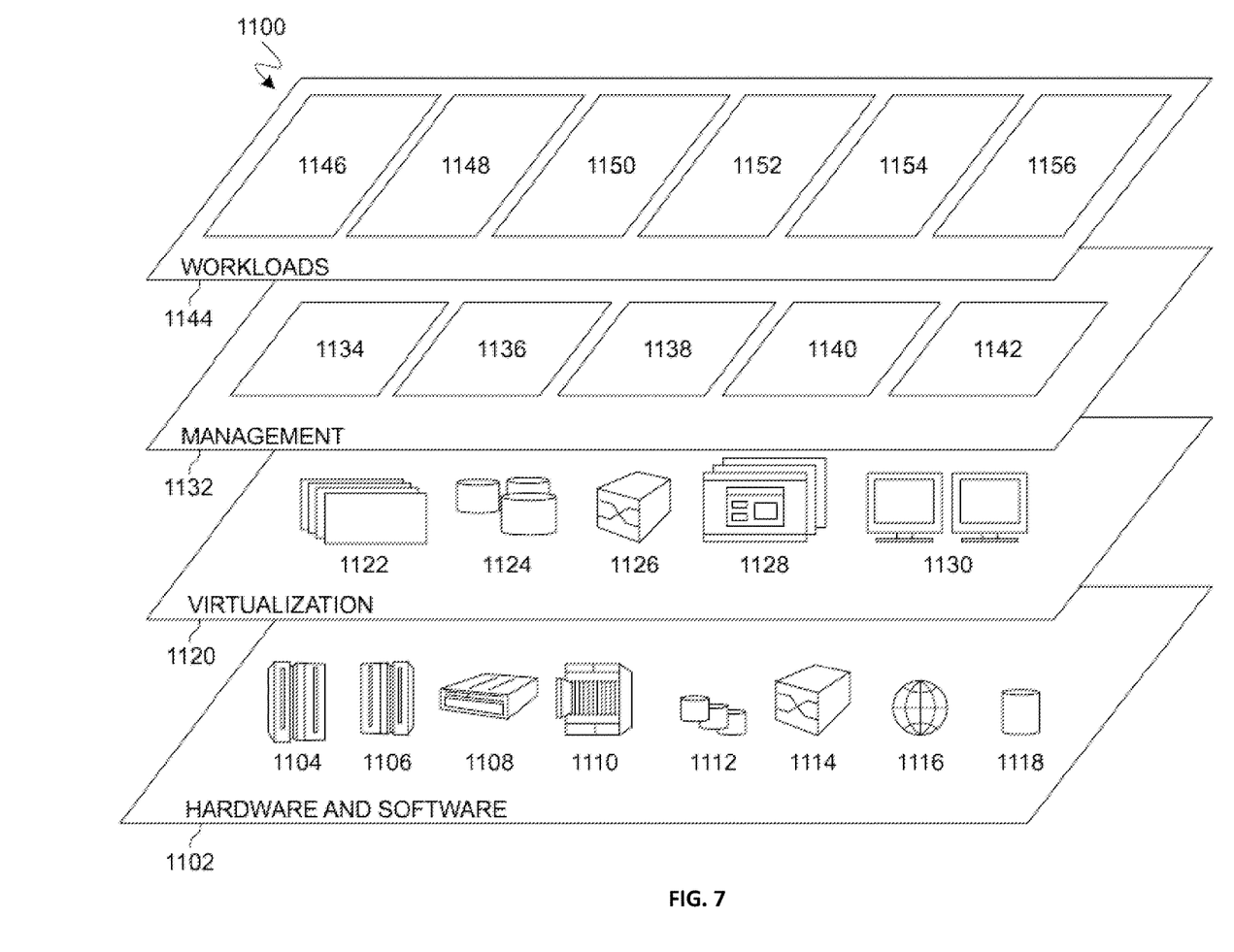
FIG. 7 is a block diagram of functional layers of the illustrative cloud computing environment of FIG. 6, in accordance with an embodiment of the present disclosure.

Referring now to FIG. 7, a set of functional abstraction layers 1100 provided by cloud computing environment 1000 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and dynamic IO throttling in a storlet environment 1156. A dynamic throttling program 110a, 110b provides a way to identify data parallelism, estimate pipelined operations in a computational algorithm, identify object storage locations and alter the throttling limits per object storage.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for dynamic Input-Output (TO) throttling in a storlet environment, the method comprising:
   receiving uploaded data content from a user;
   creating a computational algorithm based the uploaded data content;
   deploying the computational algorithm;
   determining the user has not engaged throttling based on the deployed computational algorithm;
   parsing the computational algorithm;
   identifying a pipeline operation based on the parsed computational algorithm, wherein the pipeline operation is identified based on pipeline stages;
   building a timing relation between the identified pipeline operation and an IO operation; and
   translating a timing lag to a storage IO operation based on the built timing relation.

2. The method of claim 1, further comprising:
   determining throttling is available based on the translated timing lag; and
   throttling using object storage middleware based on the determined throttling availability.

3. The method of claim 1, further comprising:
   determining throttling is available based on the translated timing lag; and
   deploy a dynamic IO throttling per storlet based on the determined throttling.

4. The method of claim 1, wherein the user engages throttling.

5. The method of claim 1, wherein parsing the computational algorithm is based on a number of IO operations that are received.

6. The method of claim 1, wherein the pipeline operation compares a plurality of objects that satisfy one or more particular criterion.

7. The method of claim 1, wherein the timing relation is built by comparing the timing of the pipeline operation with the IO operation.

8. A computer system for dynamic Input-Output (TO) throttling in a storlet environment, comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   receiving uploaded data content from a user;
   creating a computational algorithm based the uploaded data content;
   deploying the computational algorithm;
   determining the user has not engaged throttling based on the deployed computational algorithm;
   parsing the computational algorithm;
   identifying a pipeline operation based on the parsed computational algorithm, wherein the pipeline operation is identified based on pipeline stages;
   building a timing relation between the identified pipeline operation and an IO operation; and
   translating a timing lag to a storage IO operation based on the built timing relation.

9. The computer system of claim 8, further comprising:
   determining throttling is available based on the translated timing lag; and
   throttling using object storage middleware based on the determined throttling availability.

10. The computer system of claim 8, further comprising:
    determining throttling is available based on the translated timing lag; and
    deploy a dynamic IO throttling per storlet based on the determined throttling.

11. The computer system of claim 8, wherein the user engages throttling.

12. The computer system of claim 8, wherein parsing the computational algorithm is based on a number of IO operations that are received.

13. The computer system of claim 8, wherein the pipeline operation compares a plurality of objects that satisfy one or more particular criterion.

14. The computer system of claim 8, wherein the timing relation is built by comparing the timing of the pipeline operation with the IO operation.

15. A computer program product for dynamic Input-Output (IO) throttling in a storlet environment, comprising:
    one or more computer-readable storage media and program instructions stored on at least one of the one or more tangible storage media, the program instructions executable by a processor to cause the processor to perform a method comprising:
    receiving uploaded data content from a user;
    creating a computational algorithm based the uploaded data content;
    deploying the computational algorithm;
    determining the user has not engaged throttling based on the deployed computational algorithm;
    parsing the computational algorithm;
    identifying a pipeline operation based on the parsed computational algorithm, wherein the pipeline operation is identified based on pipeline stages;
    building a timing relation between the identified pipeline operation and an IO operation; and
    translating a timing lag to a storage IO operation based on the built timing relation.

16. The computer program product of claim 15, further comprising:
    determining throttling is available based on the translated timing lag; and
    throttling using object storage middleware based on the determined throttling availability.

17. The computer program product of claim 15, further comprising:
  determining throttling is available based on the translated timing lag; and
  deploy a dynamic TO throttling per storlet based on the determined throttling.

18. The computer program product of claim 15, wherein parsing the computational algorithm is based on a number of TO operations that are received.

19. The computer program product of claim 15, wherein the pipeline operation compares a plurality of objects that satisfy one or more particular criterion.

20. The computer program product of claim 15, wherein the timing relation is built by comparing the timing of the pipeline operation with the TO operation.

* * * * *